United States Patent

Whelan et al.

[11] Patent Number: 5,846,617
[45] Date of Patent: Dec. 8, 1998

[54] VANITY SHIFT KNOB ASSEMBLY AND METHOD OF REPLACEMENT

[76] Inventors: James A. Whelan; Robert J. Whelan, both of P.O. Box 624, New Hope, Pa. 18938

[21] Appl. No.: 872,001

[22] Filed: Jun. 9, 1997

[51] Int. Cl.⁶ .................................................. B60R 13/04
[52] U.S. Cl. .................................. 428/31; 156/98; 428/28
[58] Field of Search .................................. 428/11, 28, 31; 156/98

[56] References Cited

U.S. PATENT DOCUMENTS

| | | | |
|---|---|---|---|
| 298,592 | 5/1884 | Kroder | 428/28 |
| 349,640 | 9/1886 | Foy | 428/28 |
| 2,285,963 | 3/1942 | Gits et al. | 428/31 X |

*Primary Examiner*—Henry F. Epstein
*Attorney, Agent, or Firm*—LaMorte & Associates P.C.

[57] ABSTRACT

A replacement shift knob assembly for use on a truck transmission. Many truck transmissions have shift knob assemblies that contain a removable knob element with a specific bottom configuration and at least one manual switch that relies upon the specific bottom configuration of the knob element to function. The present invention replacement shift knob assembly includes a knob element made from an aesthetically pleasing material such as wood, stone, ceramic or the like. A base plate is attached to the bottom of the knob element. The base plate has a first side and an opposite second side, wherein the second side of the base plate is configured to generally physically mimic the specific bottom configuration of the original shift knob being replaced. The base plate is made from a material that differs from the replacement knob element in order to provide the base plate with greater material strength and wear resistance. As a result, a replacement shift knob assembly is provided that is aesthetically pleasing yet contains the same strength and functional elements as does the original knob element that is being replaced.

18 Claims, 5 Drawing Sheets

VANITY SHIFT KNOB ASSEMBLY AND METHOD OF REPLACEMENT

BACKGROUND OF THE INVENTION

1. Field of the Invention

The present invention relates in general to shift knob assemblies for trucks having between six and eighteen forward gears. More particularly, the present invention relates to replacement shift knob assemblies for trucks having Fuller® transmissions or the equivalent.

2. Description of the Prior Art

Most all types of manual transmissions for motor vehicles contain some type of shift knob that helps a driver grab and move the stick shift. In automobiles, the shift knob is often a static molded plastic handle that screws onto the end of the stick shift. Since the shift knob only screws onto the stick shift, the shift know is easily replaced if broken or if desired for vanity reasons. The prior art is replete with different shift knobs for automobiles. Some shift knobs are factory replacements for broken shift knobs. Others are vanity or novelty shift knobs for those who want to customize the interior of their cars.

However, in many large trucks, the shift knob on the stick shift is not merely ornamental as it is in most automobiles. Rather, in many trucks different switches are designed into the structure of the shift knob that are used when a driver shifts gears in the trucks transmission. A common type of transmission used in many american-made trucks is the Fuller® transmission, manufactured by Eaton®. In a Fuller® transmission, one or two manual switches are designed into the shift knob depending upon the model of the transmission. The purpose of the manual switches is to control valves that influence the pneumatic systems of the transmission. By opening and closing the various valves using the manual switches, a driver can change from a low setting of gears, to a medium setting of gears and to a final high setting of gears.

Referring to FIG. 1, a prior art Fuller® Model A-4900 shift knob assembly 10 is shown. Such a shift knob assembly 10 contains a first manual switch 12 for controlling a range valve in the transmission and a second manual switch 14 for controlling a selector valve in the transmission. Such shift knob assemblies 10 are well known in the art and have been in wide use for well over ten years.

Since the shift knob assemblies 10 of Fuller® transmissions contain many functional parts, both on their exterior and interior, such shift knob assemblies can not be inexpensively replaced. The expense and complexity of the shift knob assembly 10 also prevents the shift knob assembly 10 from being replaced with a vanity knob assembly that may be slightly more aesthetically appealing than the factory shift knob assembly 10.

Referring to FIG. 2, it can be seen that the Fuller® shift knob assembly 10 contains a main housing 18, a boot 22 that protects the bottom of the main housing 18 and a knob element 20 that covers the top of the main housing 18. The first manual switch 12 that controls the range valve of the transmission is contained entirely within the main housing 18 of the shift knob assembly 10. However, the second manual switch 14 that controls the selector valve of the transmission relies upon components in both the main housing 18 and the knob element 20 in order to operate properly. Referring to FIG. 3 in conjunction with FIG. 2, it can be seen that a circular relief 24 (FIG. 3) is formed in the bottom of the knob element 20. The top of the main housing 18 (FIG. 2) contains an annular ridge 26 that passes into the circular relief 24 on the bottom of the knob element 20. A pivot element 28 (FIG. 3) extends downwardly from the center of the circular relief 24 in the knob element 20. The second manual switch 14 (FIG. 2) depends upon the physical configuration of the bottom of the knob element 20 in order to function. The second manual switch 14 (FIG. 2) has a central aperture 30 that rotates around the pivot element 28 (FIG. 3) in the knob element 20. Furthermore, spacer elements 32 (FIG. 3) also extend downwardly from the circular relief 28 in the knob element 20. The spacer elements 32 limit the movement of the second manual switch 14 (FIG. 2) and ensure that the knob element 20 is properly oriented above the main housing 18. The knob element 20 is held in place by two mounting screws 34 (FIG. 2) that extend through the knob element 20 and couple the knob element 20 to the below lying main housing 18.

In the prior art, the knob element 20 is molded from a black plastic material. The knob element 20 is functional but is not particularly aesthetically pleasing. A need therefore exists in the art an assembly and method of adding aesthetically pleasing vanity knob elements to Fuller® shift knob assemblies in a manner that is cost effective and does not adversely effect the functional aspects of the shift knob assembly. This need is met by the present invention as described and claimed below.

SUMMARY OF THE INVENTION

The present invention is a replacement shift knob assembly for use on a truck transmission. Many truck transmissions have shift knob assemblies that contain a removable knob element with a specific bottom configuration and at least one manual switch that relies upon the specific bottom configuration of the knob element to function. The present invention replacement shift knob assembly includes a knob element made from an aesthetically pleasing material such as wood, stone, ceramic of the like. A base plate is attached to the bottom of the knob element. The base plate has a first side and an opposite second side, wherein the second side of the base plate is configured to generally physically mimic the specific bottom configuration of the original shift knob being replaced. The base plate is made from a material that differs from the replacement knob element in order to provide the base plate with greater material strength and wear resistance. As a result, a replacement shift knob assembly is provided that is aesthetically pleasing yet contains the same strength and functional elements as does the original knob element that is being replaced.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE PRESENT INVENTION

Figure 4:
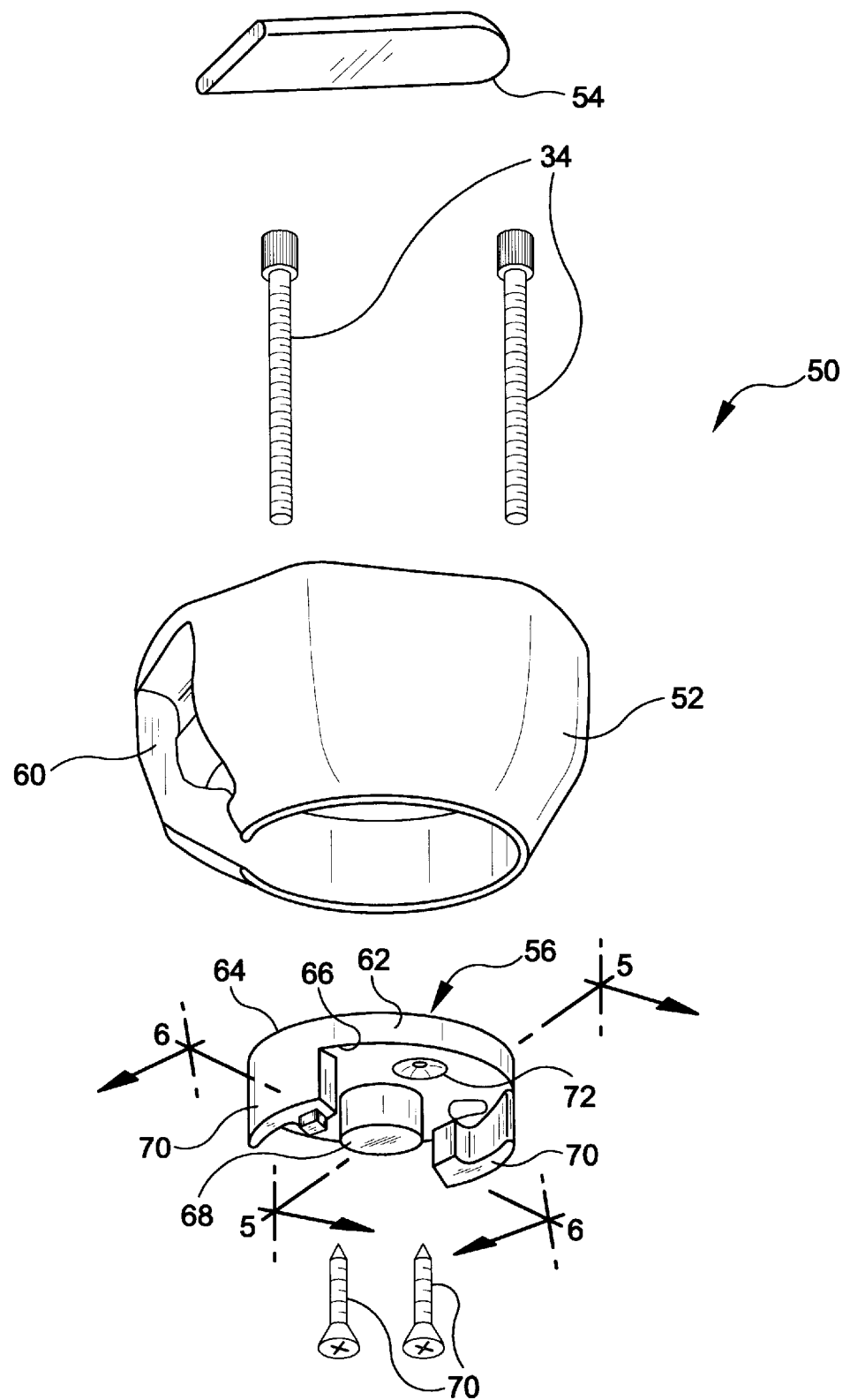
FIG. 4 is perspective view of an exemplary embodiment of a replacement knob assembly in accordance with the present invention.

Referring to FIG. 4, an exemplary embodiment of a replacement knob assembly 50 for a Fuller® transmission is shown. The replacement knob assembly 50 is comprised of a vanity knob element 52, a display plate 54 and a selector valve end plate 56. The vanity knob element 52 is made of an aesthetically appealing material such as wood, stone, bone, marble, porcelain, glass or the like. The overall shape of the vanity knob element 52 has few limitations. The vanity knob element 52 can be shaped into any form that is graspable by a driver's hand. For the purposes of illustration, the shown vanity knob element 52 is made of wood and has been given the same overall shape as the prior art plastic knob elements that come standard will Fuller® transmissions.

Figure 1:
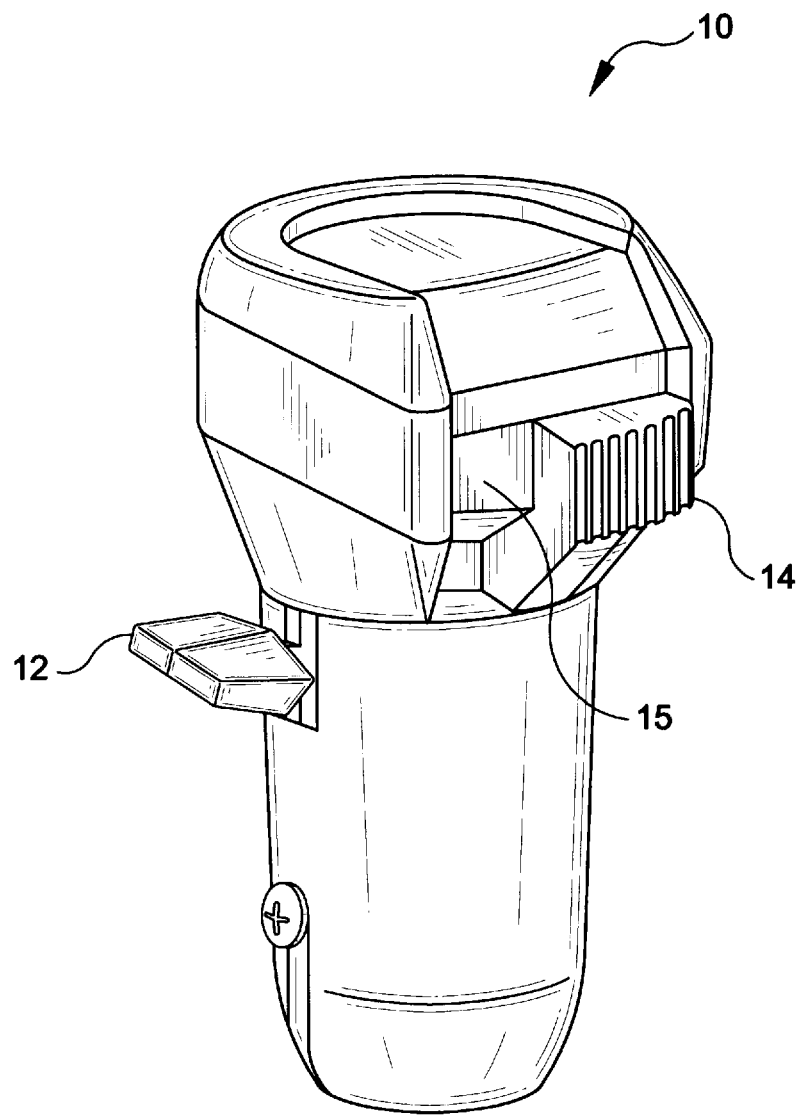
FIG. 1 is a perspective view of a prior art model A-4900 Fuller® shift knob assembly.
Figure 2:
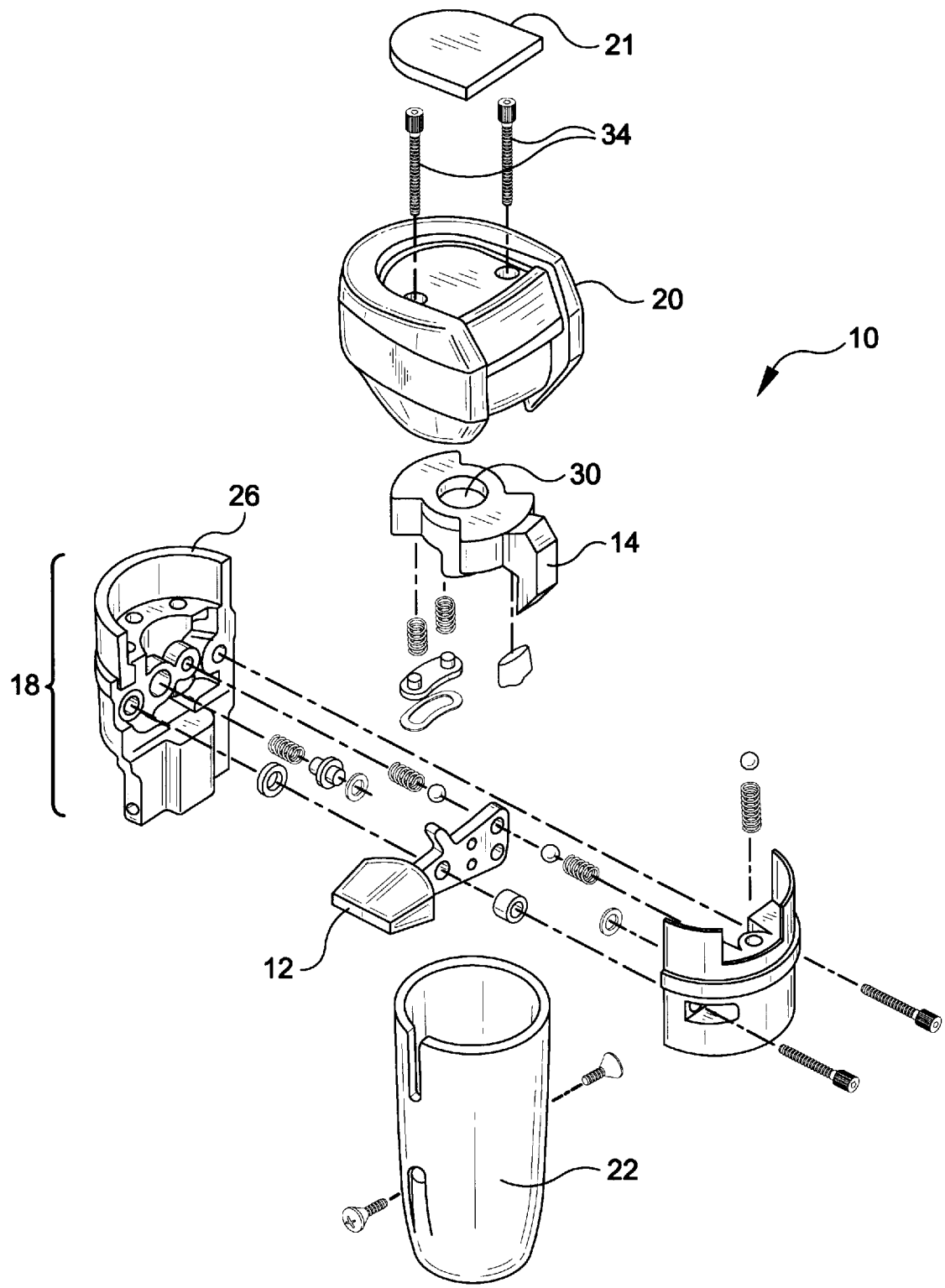
FIG. 2 an exploded perspective view of the prior art shift knob assembly shown in FIG. 1.

Regardless to the material used in manufacturing the vanity knob element 52 and the shape given to the vanity knob element 52, the vanity knob element 52 must be able to receive the a selector valve end plate 56 in a manner that enables the selector valve end plate 56 to properly engage the main housing 18 (FIG. 2) of a prior art Fuller® shift knob assembly. Furthermore, depending upon the model of shift knob being replaced, the replacement vanity knob element 52 must contain the appropriately sized relief 60 on a side surface for receiving the second manual switch 14 (FIG. 2) of the selector valve. Currently, Fuller® manufactures three primary shift knob assemblies. The Model A-4900 shift knob assembly is shown in FIG. 1 and has a relief 15 (FIG. 1) of predetermined dimensions to accommodate the second manual switch 14 for the selector valve. Fuller® also manufactures the Model A-5015 shift knob assembly that has a slightly different sized relief to accommodate a manual switch. Lastly, Fuller® manufactures the model A-5010 shift knob assembly that does not have selector valve, therefore no relief is required. Depending upon which type of Fuller® shift knob assembly is being modified, the replacement shift knob element will have the appropriately sized relief to allow the various manual switches to operate.

Figure 3:
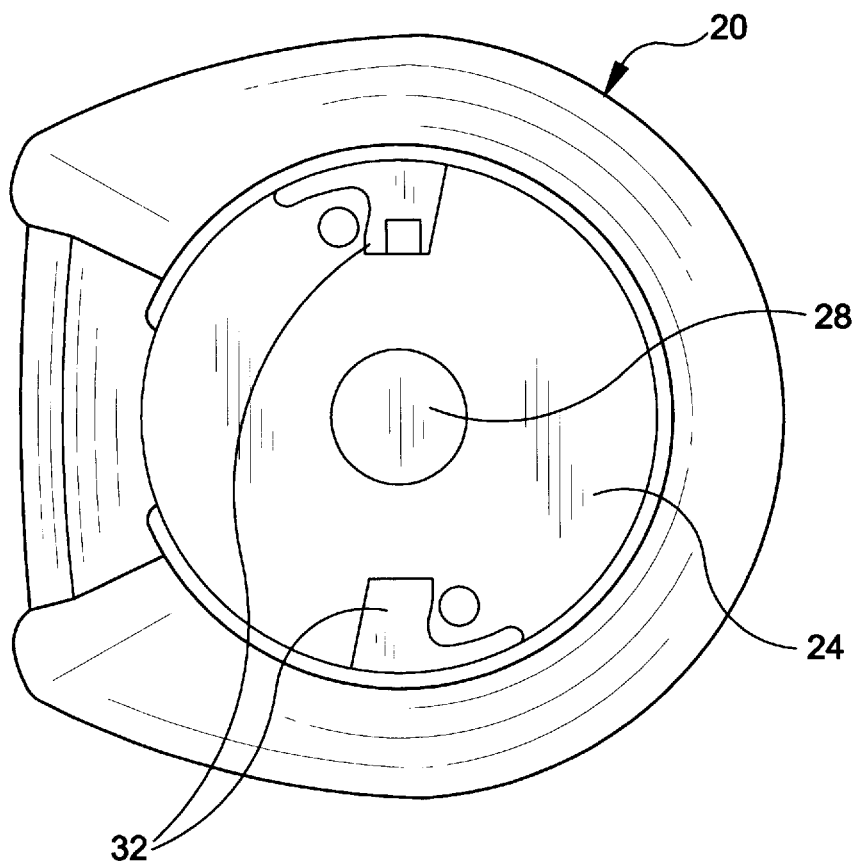
FIG. 3 is a bottom view of a knob element component of the prior art shift knob assembly shown in FIG. 1.

Since the replacement vanity knob element 52 is made of wood, stone or other material that must be machined, it would be highly labor intensive and expensive to manufacture the selector valve end plate 56 as part of the vanity knob element. Furthermore, the components on the selector valve end plate 56 experience shearing forces as a driver manipulates the switches on the shift knob assembly. Materials such as stone, glass, wood, porcelain and the like do not resist shearing forces well. Accordingly, such materials are not appropriate for the manufacture of the selector valve end plate 56. In the preferred embodiment of the present invention, the selector valve end plate 56 is manufactured as a separate unit. This solves the problems of high manufacturing cost and low strength previously stated. The selector valve end plate 56 is preferably molded from a reinforced plastic material or is die cast of metal. The selector valve end plate 56 is manufactured with a circular base 62 having a flat top surface 64 and a flat bottom surface 66. A pivot element 68 extends downwardly from the center of the bottom surface 66. Similarly, two spacer elements 70 extend down from the bottom surface 66 at points near the peripheral edge of the bottom surface 66. The pivot element 68 and spacer elements 70 are manufactured with the same dimensions as are present in a stock Fuller® shift knob assembly (See FIG. 3).

Figure 5:
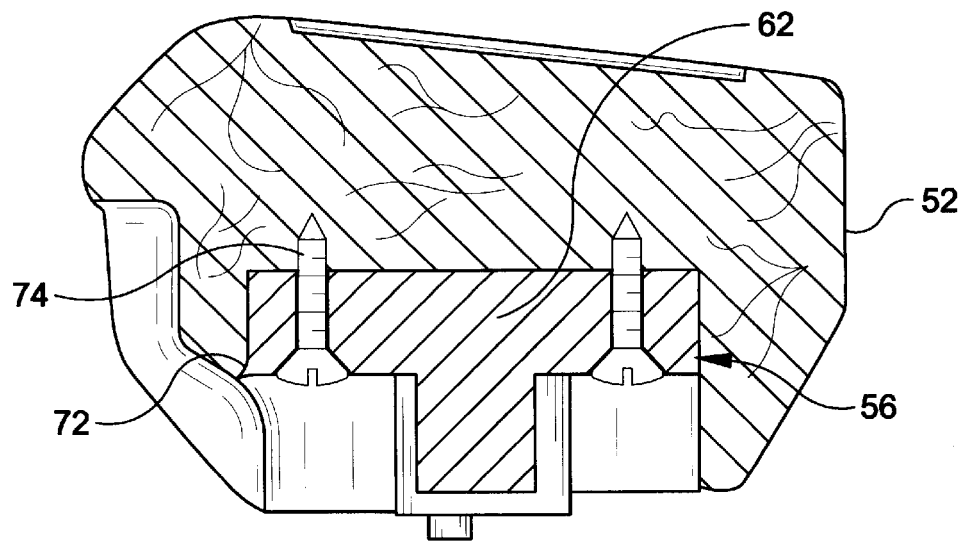
FIG. 5 is cross-sectional view of the embodiment of the present invention shown in FIG. 4, viewed along section line 5—5.

Referring to FIG. 5 in conjunction with FIG. 4, it can be seen that two countersunk screw holes 72 are formed through the circular base 62 of the selector valve end plate 56. Two screw 74 pass through the screw holes 72 and secure the selector valve end plate 56 to the vanity knob element 52. The use of screws is preferred, however, it should be understood that depending upon the material of the vanity knob element 52, alternative attachment means, such as glue or epoxy can be used to attach the selector valve end plate 56 to the vanity knob element 52.

Figure 6:
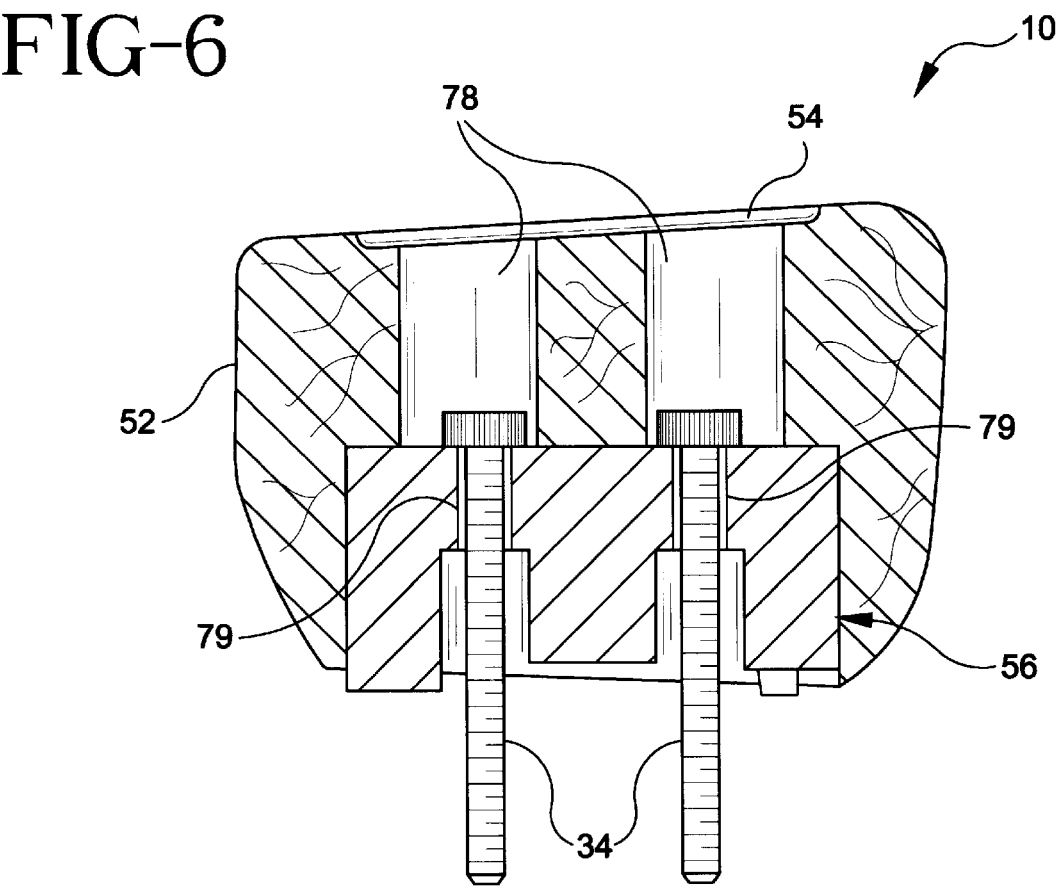
FIG. 6 is a cross-sectional view of the embodiment of the present invention shown in FIG. 4, viewed along section line 6—6.

Referring to FIG. 6 it can be seen that the vanity knob element 52 attaches to the main housing 18 (FIG. 2) of a Fuller® shift knob assembly through the use of two mounting screws 34. Two large bores 78 are formed in the vanity knob element 52 below the display plate 54. The two bores 78 align with mounting holes 79 formed in the selector valve end plate 56. The mounting screws 34 engage the selector valve end plate 56, thereby enabling the replacement knob assembly 10 to be mounted to the main housing 18 (FIG. 2) of a prior art Fuller® shift knob assembly.

Referring back to FIG. 2, it can be seen that to replace the knob element 20 of the Fuller® shift knob assembly, the display plate 21 is removed and the two mounting bolts 34 are unscrewed. The knob element 20 can then be removed from the below lying main housing 18. Referring to FIG. 4, the present invention replacement vanity knob assembly 50 can then be substituted for the original knob element using the same mounting bolts 34.

Since the bottom of the replacement vanity knob element contains a selector valve end plate 56 that is identical in form to the bottom of the original knob element being replaced, the replacement vanity knob can be substituted without adversely effecting the functional elements embodied that rely upon the structure of the knob element for their operation.

After the replacement vanity knob assembly 50 is mounted, a display plate 54 is attached to the top of the vanity knob element 52 to cover the mounting holes and to present an aesthetically appealing appearance. The display plate 54 is preferably attached to the vanity knob element 52 with adhesive or doubled sided tape. The display plate 52 can show an image of the shift pattern for the transmission, a trademark logo or any other image so desired.

It will be understood that the embodiment of the present invention replacement vanity knob illustrated and described above is merely exemplary and many variations and modifications can be made by using functionally equivalent components and/or alternate embodiments. All such variations and modifications are intended to be included within the scope of the invention as defined by the appended claims.

What is claimed is:

1. A shift knob assembly, comprising:
    a knob element having a top end and a bottom end, wherein a relief is disposed in said bottom end;
    a base plate having a peripheral edge and a center, wherein said base plate is sized to fit within said relief of said knob element;
    a cylindrical pivot element extending downwardly from said base plate at a point proximate said center of said base plate;
    at least one spacer extending downwardly from said base plate from a point proximate said peripheral edge of said base plate; and
    a fastening mechanism for selectively affixing said base plate to said knob element within said relief of said knob element.

2. The assembly according to claim 1, wherein said knob element is fabricated from a first material that is selected from a group consisting of wood, stone, glass and porcelain.

3. The assembly according to claim 1, further including a display plate affixed to said top end of said knob element.

4. The assembly according to claim 1, wherein said base plate is fabricated from a material selected from a group consisting of plastic and metal.

5. The assembly according to claim 1, wherein said relief that is disposed in said bottom end of said knob element is generally cylindrical in shape.

6. The assembly according to claim 5, wherein said knob element has a side surface and an aperture is disposed through said side surface that communicates with said circular relief.

7. The assembly according to claim 1 wherein a first plurality of bores are disposed through said knob element from said top end through to said relief and said base plate includes a second plurality of bores that align with said first plurality of bores when said base plate is positioned within said relief.

8. The assembly according to claim 7, further including a set of mounting screws that extend through said first set of bores in said knob element and said second set of bores in said base plate.

9. The assembly according to claim 1, wherein said fastening mechanism for selectively joining said base plate to said knob element includes screws.

10. In a shift knob assembly containing a removable knob with a pivot element and spacers on its bottom surface, and a manual switch that interacts with pivot element and the spacers during the operation of said manual switch, a replacement knob assembly comprising:

a knob element having a top surface, a bottom surface, and a relief disposed within said bottom surface;

a base plate sized to fit within said relief, wherein said base plate contains a pivot element and spacers depending therefrom that are configured to interact with the manual switch during the operation of the manual switch; and mechanical fasteners for selectively attaching said base plate to said knob element within said relief.

11. The assembly according to claim 10, wherein said knob element is fabricated from a first material that is selected from a group consisting of wood, stone, glass and porcelain.

12. The assembly according to claim 11, wherein said base plate is fabricated from a material that is selected from a group consisting of metal and plastic.

13. The assembly according to claim 11 wherein a first plurality of bores are disposed through said knob element from said top surface through to said bottom surface and said base plate includes a second plurality of bores that align with said first plurality of bores when said base plate is positioned within said relief.

14. The assembly according to claim 11 wherein said pivot element is a cylindrical post that extends downwardly from said base plate at a point near its center.

15. A method of replacing an original knob element on a shift knob assembly that contains a manual switch, wherein the original knob element has a predetermined physical configuration on its bottom surface that is required for the operation of the manual switch, said method comprising the steps of:

providing a replacement knob element;

providing a base plate having generally the same physical configuration as the bottom surface of the original knob element;

affixing said base plate to said replacement knob element to form a replacement knob assembly;

removing the original knob element from the shift knob assembly; and attaching the replacement knob assembly to the shift knob assembly.

16. The method according to claim 15, wherein said step of providing a replacement knob element includes fabricating said replacement knob element from wood.

17. The method according to claim 16, wherein said step of providing a base plate includes molding said base plate from a moldable material.

18. The method according to claim 17, wherein said step of affixing said base plate to said replacement knob element includes fastening said base plate to said replacement knob element with screws.

* * * * *